(12) United States Patent
Shiraishi et al.

(10) Patent No.: US 11,677,300 B2
(45) Date of Patent: Jun. 13, 2023

(54) MOTOR AND BLOWER

(71) Applicant: Nidec Corporation, Kyoto (JP)

(72) Inventors: Yukinobu Shiraishi, Kyoto (JP);
Takashi Uchino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 339 days.

(21) Appl. No.: 17/015,895

(22) Filed: Sep. 9, 2020

(65) Prior Publication Data

US 2021/0099043 A1 Apr. 1, 2021

(30) Foreign Application Priority Data

Sep. 26, 2019 (JP) ............................. JP2019-176168

(51) Int. Cl.
| | |
|---|---|
| *H02K 11/33* | (2016.01) |
| *H02K 3/52* | (2006.01) |
| *H02K 7/14* | (2006.01) |
| *H02K 21/22* | (2006.01) |
| *H02K 5/22* | (2006.01) |
| *F04D 25/06* | (2006.01) |

(52) U.S. Cl.
CPC ............. *H02K 11/33* (2016.01); *H02K 3/522* (2013.01); *H02K 5/225* (2013.01); *H02K 7/14* (2013.01); *H02K 21/22* (2013.01); *F04D 25/06* (2013.01); *H02K 2211/03* (2013.01)

(58) Field of Classification Search
CPC ........ H02K 21/22; H02K 11/33; H02K 11/30; H02K 3/522; H02K 3/50; H02K 7/14; H02K 2211/03; H02K 11/00; H02K 5/225; H02K 5/22; H02K 5/24; F04D 25/0646; F04D 25/0633; F04D 29/023; F04D 25/06

USPC .................................................. 310/71, 68 R
See application file for complete search history.

(56) References Cited

U.S. PATENT DOCUMENTS

| | | | |
|---|---|---|---|
| 2007/0007834 A1* | 1/2007 | Teshima ................. | H02K 3/522 310/67 R |
| 2014/0314596 A1* | 10/2014 | Kudo ....................... | H02K 7/14 417/420 |

(Continued)

FOREIGN PATENT DOCUMENTS

| | | | |
|---|---|---|---|
| JP | 2000116098 A | * | 4/2000 |
| JP | 2013-188091 A | | 9/2013 |

OTHER PUBLICATIONS

Watanabe et al, Brushless Fan Motor and Manufacture Thereof, Apr. 21, 2000, JP 2000116098 (English Machine Translation) (Year: 2000).*

*Primary Examiner* — Alexander A Singh
(74) *Attorney, Agent, or Firm* — Keating & Bennett

(57) ABSTRACT

A motor including a rotating portion that rotates about a center axis that extends vertically and a stationary portion that rotatably supports the rotating portion. The stationary portion includes a stator including a coil, radially facing at least a portion of the rotating portion, a base disposed axially below the stator, a circuit board disposed axially between the stator and the base, a conductor electrically connected to the coil and the circuit board, including an extending portion extending axially downward from the circuit board, and a resin portion covering the circuit board and the conductor, connecting the base and the stator. The base is provided in its axially upper surface with an opening that overlaps the conductor when viewed axially.

9 Claims, 6 Drawing Sheets

(56) References Cited

U.S. PATENT DOCUMENTS

2018/0069457 A1* 3/2018 Michishita ............ H02K 11/215
2018/0166942 A1* 6/2018 Aoi ........................ H02K 11/33

* cited by examiner

【Fig.1】
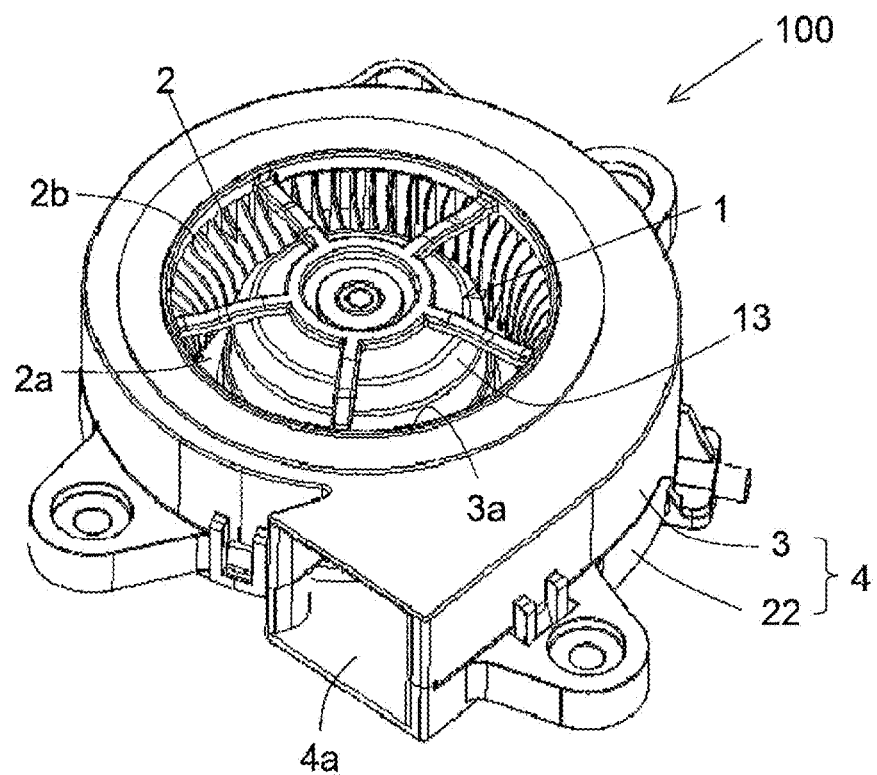
【Fig.2】
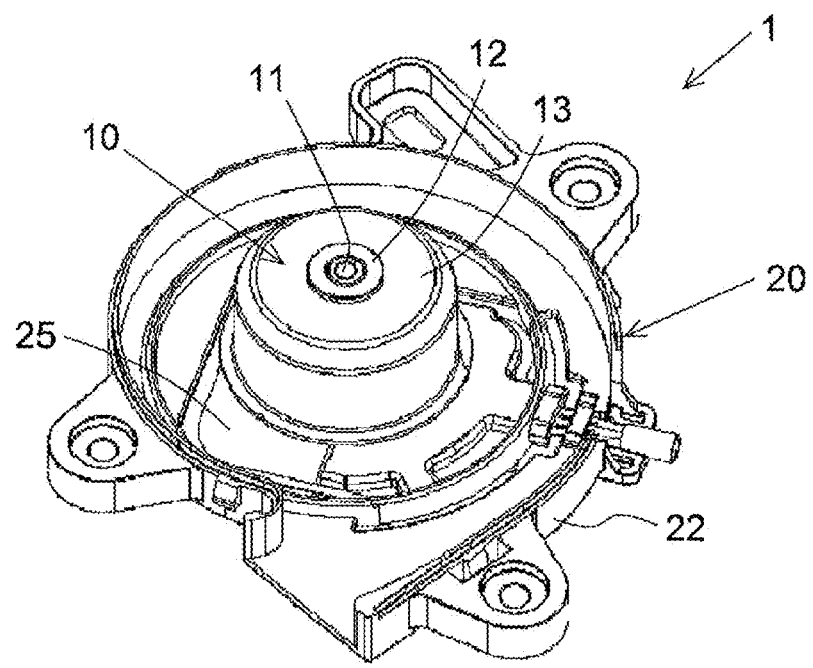

[Fig. 3]
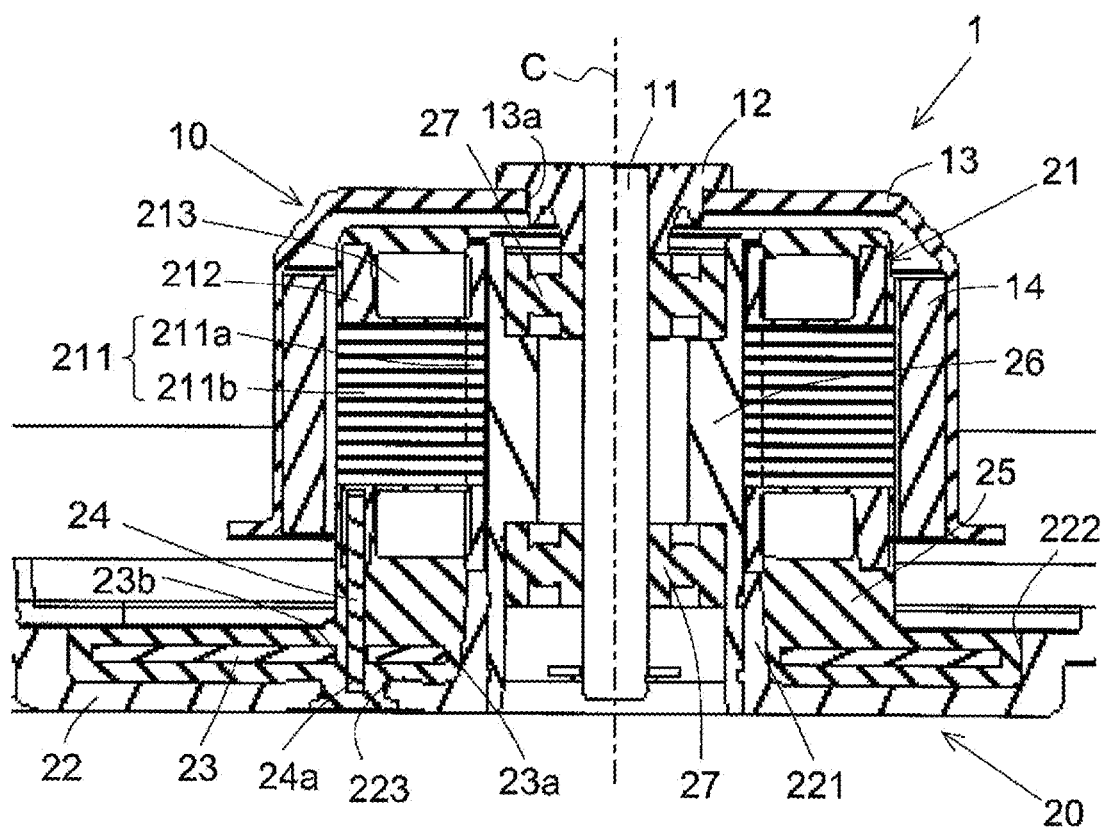

[Fig.4]
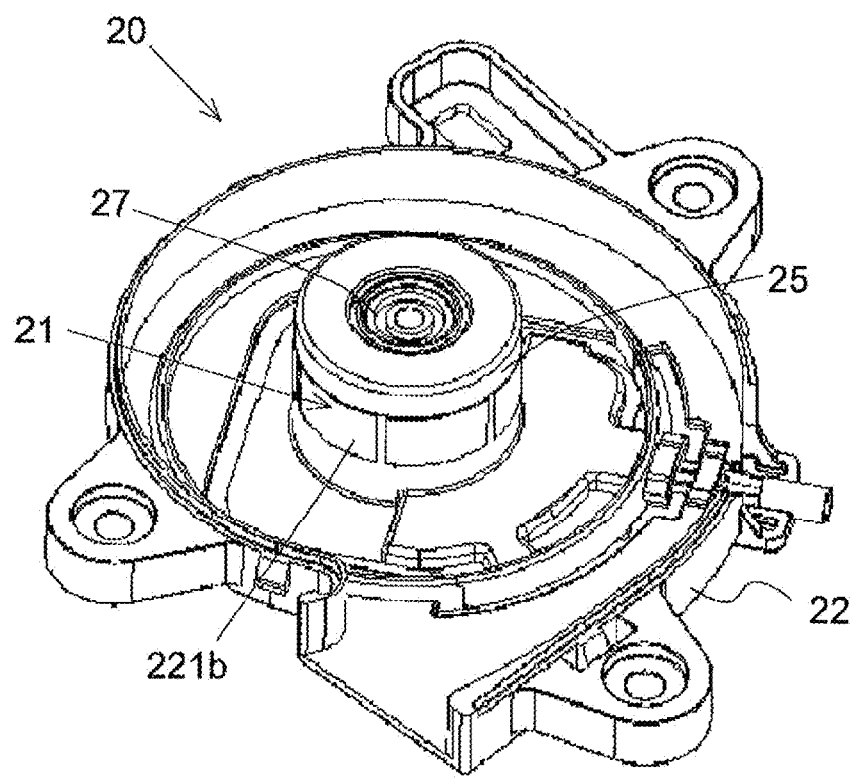

【Fig. 5】
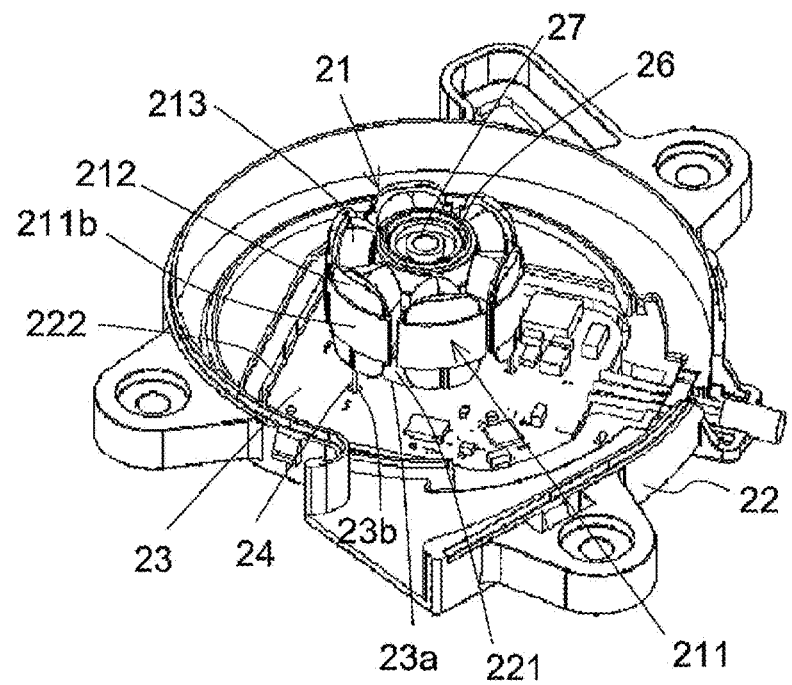
【Fig.6】
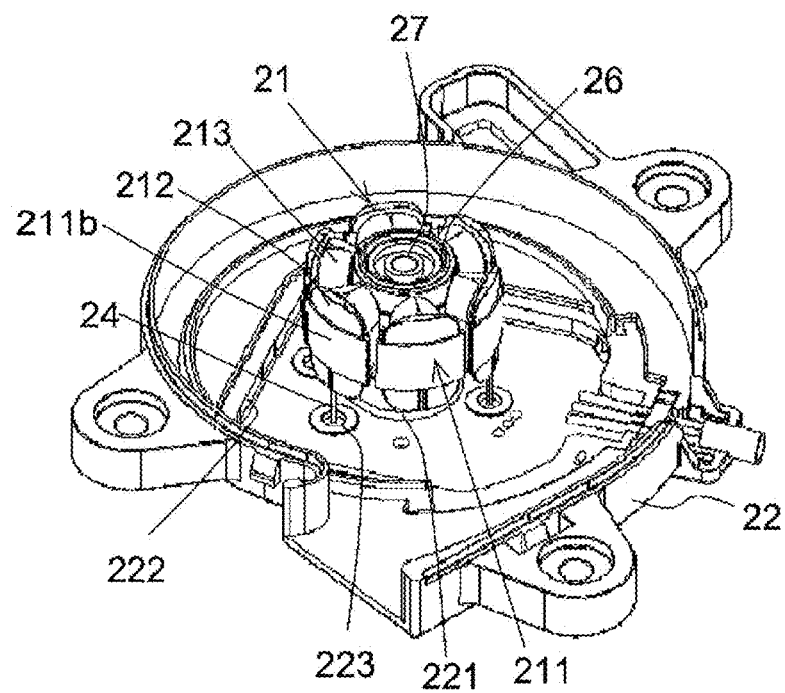

【Fig. 7】
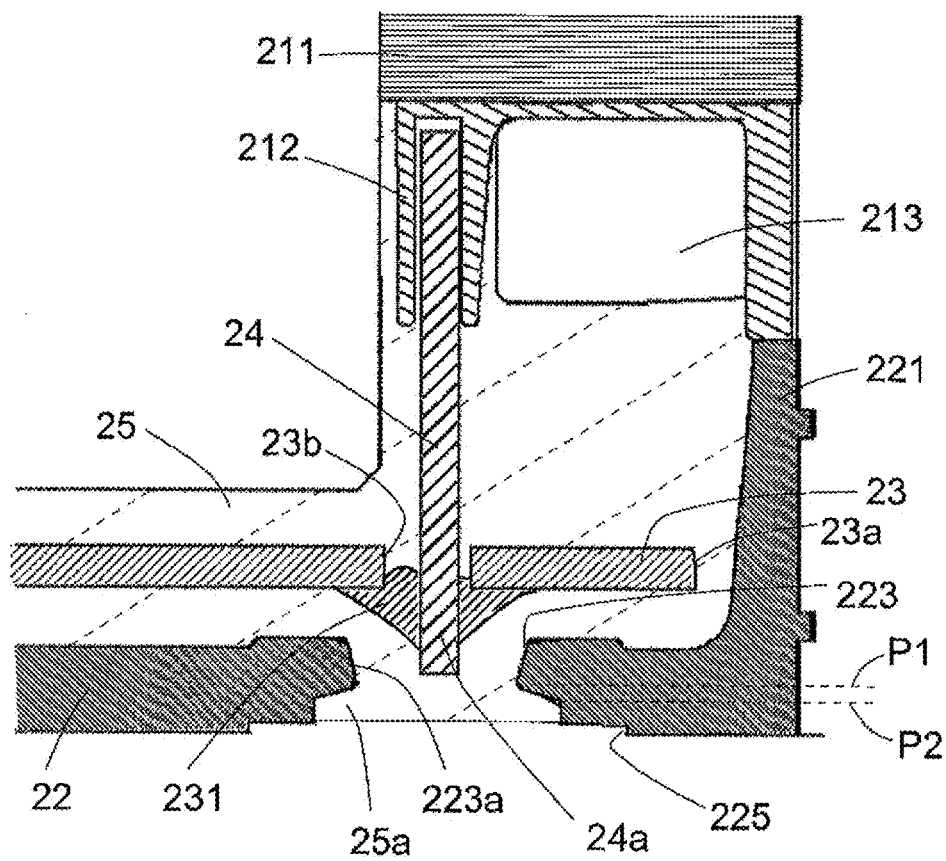
【Fig. 8】
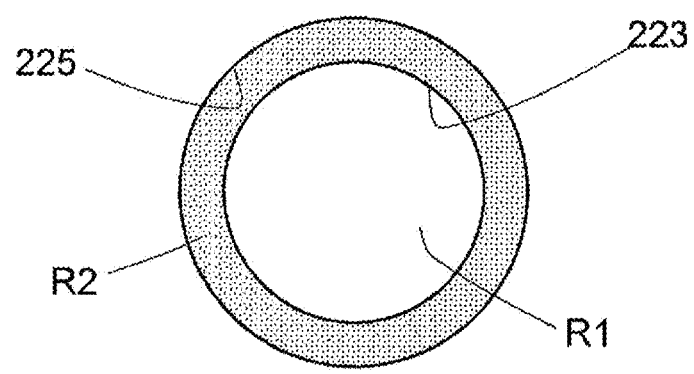

[Fig. 9]
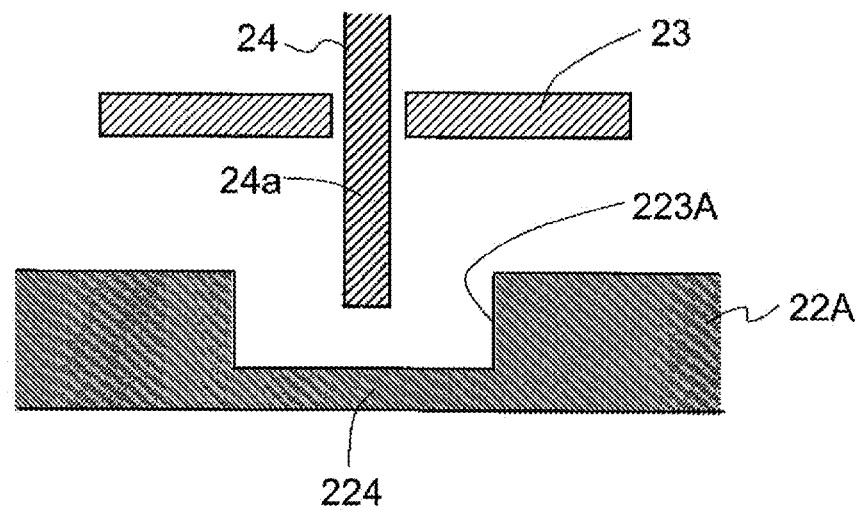
[Fig. 10]
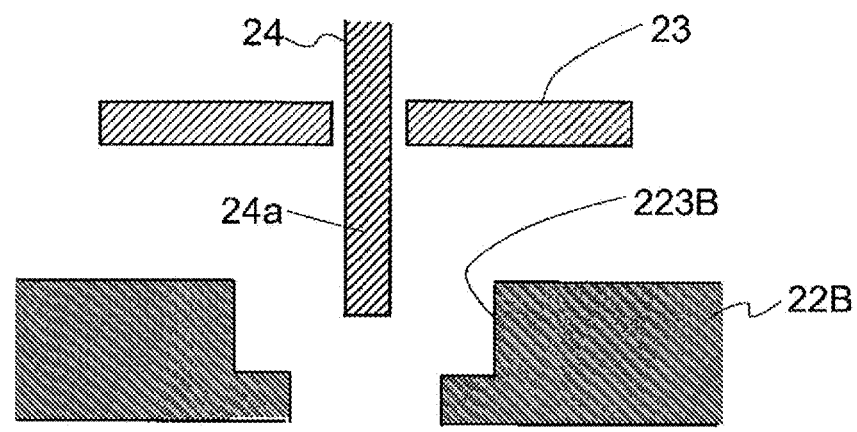

MOTOR AND BLOWER

CROSS REFERENCE TO RELATED APPLICATION

The present application claims priority under 35 U.S.C. § 119 to Japanese Application No. 2019-176168 filed on Sep. 26, 2019, the entire contents of which are hereby incorporated herein by reference.

FIELD OF THE INVENTION

The present disclosure relates to a motor and a blower.

BACKGROUND

Conventionally, known examples of a motor having a base and a stator attached to the base have each a structure in which a circuit board is disposed between the base and the stator, and the stator and the circuit board are sealed with resin disposed on the base.

This motor is configured such that a terminal pin fixed to the stator is entangled with a conducting wire drawn from the coil, for example, to electrically connect a coil of the stator and the circuit board disposed below the stator, and the terminal pin is fixed to the circuit board by soldering. The terminal pin passes through the circuit board, and a leading end of the terminal pin projects below the circuit board.

Conventional motors each have a structure in which a distance between the base and the terminal pin passing through the circuit board disposed between the base and the stator may be reduced in an attempt to reduce a thickness of the motor, for example. In such a case, the resin may be less likely to flow below the terminal pin. Reducing the thickness of the motor may cause variations in dimensions of assembly or parts, for example, so that the terminal pin may come into contact with the base during manufacturing.

SUMMARY

A motor according to an example embodiment of the present disclosure includes a rotating portion that rotates about a center axis that extends vertically and a stationary portion that rotatably supports the rotating portion. The stationary portion includes a stator including a coil, radially facing at least a portion of the rotating portion, a base disposed axially below the stator, a circuit board disposed axially between the stator and the base, a conductor electrically connected to the coil and the circuit board, including an extending portion extending axially downward from the circuit board, and a resin portion covering the circuit board and the conductor, connecting the base and the stator. The base is provided in its axially upper surface with an opening that overlaps the conductor when viewed axially.

A blower according to an example embodiment of the present disclosure includes a motor according to an example embodiment of the present disclosure, and an impeller that rotates together with the rotating portion.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a perspective view of a blower according to an example embodiment of the present disclosure.

FIG. 2 is a perspective view of a motor according to an example embodiment of the present disclosure.

FIG. 3 is a schematic longitudinal sectional view of a motor according to an example embodiment of the present disclosure.

FIG. 4 is a perspective view of a stationary part included in a motor according to an example embodiment of the present disclosure.

FIG. 5 is a view in which a resin portion is removed from the stationary part illustrated in FIG. 4.

FIG. 6 is a view of FIG. 5 excluding a circuit board.

FIG. 7 is a schematic longitudinal sectional view illustrating an enlarged periphery of a conductive member.

FIG. 8 is a plan view schematically illustrating a relationship between a base lower surface recessed portion and an opening.

FIG. 9 is a view for illustrating a first modification of a motor according to an example embodiment of the present disclosure.

FIG. 10 is a view for illustrating a second modification of a motor according to an example embodiment of the present disclosure.

DETAILED DESCRIPTION

Hereinafter, example embodiments of the present disclosure will be described in detail with reference to the drawings. The present specification describes a blower 100 and a motor 1 with directions with respect to a center axis C of the motor 1 illustrated in FIG. 3, the directions including: a direction parallel to the center axis C that is referred to as an "axial direction", "axial", or "axially"; a direction orthogonal to the center axis C that is referred to as a "radial direction", "radial", or "radially"; and a direction along a circular arc about the center axis C that is referred to as a "circumferential direction", "circumferential", or "circumferentially". The present specification also describes a shape and a positional relationship of each part with the axial direction as a vertical direction with a lower side on which a base 22 is provided with respect to a stator 21. However, this definition of the vertical direction does not intend to limit a direction of each of the blower 100 and the motor 1 according to the present disclosure at the time of use. The present specification describes an area of an opening that indicates an area of a region provided with the opening. That is, the area of the opening indicates the area of the region of the opening.

FIG. 1 is a perspective view of the blower 100 according to an example embodiment of the present disclosure. The blower 100 of the present example embodiment is a centrifugal fan. However, the blower to which the present disclosure is applied is not limited to the centrifugal fan, and may be, for example, an axial fan or a turbo fan. As illustrated in FIG. 1, the blower 100 includes the motor 1 and an impeller 2. The blower 100 further includes a fan cover 3. Details of the motor 1 will be described later.

The impeller 2 is driven by the motor 1 to rotate about the center axis C. The impeller 2 includes an impeller annular portion 2a and a plurality of blade portions 2b. The impeller 2 is made of resin, for example. In the present example embodiment, the impeller annular portion 2a and the plurality of blade portions 2b constitute a single member. However, the impeller annular portion 2a and the plurality of blade portions 2b may be separate members.

The impeller annular portion 2a has an annular shape about the center axis C. The impeller annular portion 2a is attached to a rotating part 10 of the motor 1 described later.

That is, the impeller 2 rotates together with the rotating part 10. At least a part of each blade portion 2b is disposed on an axially upper surface of the impeller annular portion 2a. Each blade portion 2b extends from the impeller annular portion 2a in a direction away from the center axis C. The direction away from the center axis C may be parallel to the radial direction or may be a direction inclined with respect to the radial direction. The plurality of blade portions 2b is disposed at intervals in the circumferential direction. In the present example embodiment, the plurality of blade portions 2b is disposed at equal intervals in the circumferential direction.

The fan cover 3 constitutes a housing 4 of the blower 100 in combination with the base 22 of the motor 1 described later. The fan cover 3 is provided with a cover through-hole 3a in a circular shape about the center axis C in plan view in the axial direction, the cover through-hole 3a passing through the fan cover 3 in the axial direction.

The blower 100 is configured such that driving of the motor 1 causes the impeller 2 to rotate to allow air to flow into the housing 4 from the outside through the cover through-hole 3a. The air having flowed into the housing 4 flows in a direction away from the center axis C along the plurality of blade portions 2b and blows out to the outside from a housing opening 4a provided in the housing 4. The blower 100 of the present example embodiment can be reduced in axial thickness because the motor 1 can be reduced in axial thickness as described below.

FIG. 2 is a perspective view of the motor 1 according to an example embodiment of the present disclosure. FIG. 3 is a schematic longitudinal sectional view of the motor 1 according to an example embodiment of the present disclosure. As illustrated in FIGS. 2 and 3, the motor 1 includes the rotating part 10 and a stationary part 20.

The rotating part 10 rotates about the center axis C extending vertically. The rotating part 10 includes a shaft 11, a bush 12, a rotor holder 13, and a magnet 14.

The shaft 11 is a columnar member disposed along the center axis C. As a material of the shaft 11, for example, a metal such as stainless steel is used. In the present example embodiment, the shaft 11 rotates about the center axis C. However, the shaft 11 may be configured to be fixed to the base 22 or the like in a non-rotating manner. That is, the rotating part 10 may not include the shaft 11.

The bush 12 has a tubular shape extending in the axial direction. The shaft 11 has an upper end fitted into the bush 12, and the bush 12 is fixed to the upper end of the shaft 11.

The rotor holder 13 opens downward in the axial direction and has a cylindrical shape with a lid. The rotor holder 13 has an upper wall provided in its central portion with a rotor holder through-hole 13a passing through the upper wall in the axial direction. The rotor holder through-hole 13a has a circular shape about the center axis C in plan view in the axial direction. The bush 12 is fitted into the rotor holder through-hole 13a, and the bush 12 is fixed to the rotor holder 13. That is, the rotor holder 13 is provided in a rotatable manner about the center axis C together with the shaft 11.

The rotor holder 13 is fitted in the impeller annular portion 2a, and the impeller 2 is fixed to the rotor holder 13. That is, the impeller 2 rotates with rotation of the rotor holder 13.

The magnet 14 is fixed to a radially inner surface of a side wall constituting a radially outer surface of the rotor holder 13. In the present example embodiment, the magnet 14 is a single annular magnet. The magnet 14 has a radially inner surface on which N poles and S poles are alternately disposed in the circumferential direction. However, instead of a single annular magnet, a plurality of magnets may be disposed on the radially inner surface of the side wall constituting the radially outer surface of the rotor holder 13. In this case, the plurality of magnets is disposed in the circumferential direction.

The stationary part 20 rotatably supports the rotating part 10. FIG. 4 is a perspective view of the stationary part 20 included in the motor 1 according to an example embodiment of the present disclosure. FIG. 4 is a view in which the rotating part 10 is removed from the motor 1 illustrated in FIG. 2. FIG. 5 is a view in which a resin portion 25 is removed from the stationary part 20 illustrated in FIG. 4. As illustrated in FIGS. 2 to 5, the stationary part 20 includes a stator 21, a base 22, a circuit board 23, a conductive member 24, and the resin portion 25. The stationary part 20 further includes a bearing holder 26 and a bearing 27.

The stator 21 is an armature that generates a magnetic flux in accordance with a drive current. The stator 21 faces at least a part of the rotating part 10 in the radial direction. In the present example embodiment, the stator 21 faces a part of the rotating part 10 in the radial direction. The stator 21 is disposed radially inward of a part of the rotating part 10. Specifically, the stator 21 includes a coil 213. The stator 21 further includes a stator core 211 and an insulator 212.

The stator core 211 is a magnetic body. For example, the stator core 211 is formed by layering electromagnetic steel plates. The magnet 14 is disposed radially outward of the stator core 211 at an interval in the radial direction. The stator core 211 includes a core back 211a in an annular shape about the center axis C and a plurality of teeth 211b extending radially outward from the core back 211a. The plurality of teeth 211b is disposed at intervals in the circumferential direction.

The insulator 212 is an insulating body. As a material of the insulator 212, for example, resin may be used. In the present example embodiment, at least a part of the stator core 211 is covered with the insulator 212. Each of the teeth 211b has a radially outer surface exposed without being covered with the insulator 212. The radially outer surface of each of the teeth 211b faces the magnet 14 at an interval in the radial direction. The coil 213 is formed by winding a conductive wire around each of the teeth 211b with the insulator 212 interposed therebetween. That is, the stator 21 includes a plurality of the coils 213.

The base 22 is disposed axially below the stator 21. In the present example embodiment, the base 22 is made of resin. However, the base 22 may be made of a material other than resin such as metal. The base 22 is provided in its central portion with a base tubular portion 221 about the center axis C, extending in the axial direction. The base 22 is provided in its axially upper surface with a base recess 222 that is recessed downward in the axial direction and that accommodates the circuit board 23.

The circuit board 23 is disposed between the stator 21 and the base 22 in the axial direction. The circuit board 23 includes an electric circuit for supplying a drive current to the coil 213. The circuit board 23 has an axially upper surface on which various electric components are mounted. The circuit board 23 is provided with a first circuit board through-hole 23a that passes through the circuit board 23 in the axial direction and through which the base tubular portion 221 passes. The circuit board 23 is also provided with a second circuit board through-hole 23b that passes through the circuit board 23 in the axial direction and through which the conductive member 24 passes.

The conductive member 24 is electrically connected to the coil 213 and the circuit board 23. The conductive member 24 is electrically connected to each of the coil 213 and the circuit board 23. In the present example embodiment, the conductive member 24 has the shape of a pin extending in the axial direction. Specifically, the conductive member 24 is a terminal pin in a prismatic shape. However, the conductive member 24 may have another columnar shape such as a cylindrical columnar shape. The conductive member 24 is fixed to the insulator 212. The conductive member 24 is entangled with a conducting wire drawn from the coil 213. The conductive member 24 has an axially lower portion that partly extends axially downward from the circuit board 23 through the second circuit board through-hole 23b. That is, the conductive member 24 includes an extending portion 24a extending axially downward from the circuit board 23. The conductive member 24 is fixed to the circuit board 23 with solder 231 (refer to FIG. 7) on an axially lower side of the circuit board 23. The solder 231 may not partly enter the second circuit board through-hole 23b. In the present example embodiment, the stationary part 20 includes a plurality of the conductive members 24. Specifically, four conductive members 24 are provided. However, the number of the conductive members 24 may be changed as appropriate.

The conductive member 24 does not need to have the shape of a pin as long as it has a portion extending in the axial direction, and may be, for example, a flat terminal extending in the axial direction. The conductive member 24 only needs to be electrically connected to the coil 213, and may not be entangled with the conducting wire drawn from the coil 213.

The resin portion 25 is configured to cover the circuit board 23 and the conductive member 24. The resin portion 25 connects the base 22 and the stator 21. The base 22 and the stator 21 are mechanically connected by the resin portion 25. The resin portion 25 can be made of a hot melt resin, for example. In the present example embodiment, the resin constituting the resin portion 25 is poured into the base recess 222 accommodating the circuit board 23 to cover the circuit board 23. The resin constituting the resin portion 25 is also poured along a shape of a mold temporarily disposed on an axially upper surface of the base 22 during manufacturing to cover the conductive member 24 and the stator 21. The resin portion 25 covering the stator 21, the circuit board 23, and the conductive member 24 is integrally connected as a whole.

The resin portion 25 may be configured to cover the entire stator 21, but a part of the stator 21 may not be covered with the resin portion 25. That is, the resin portion 25 may be configured to cover at least a part of the stator 21. In the present example embodiment, the radially outer surface of each of the teeth 211b is exposed without being covered with the resin portion 25.

The bearing holder 26 has a cylindrical shape about the center axis C. The bearing holder 26 holds the bearing 27 disposed radially inward of the holder. The bearing holder 26 is fitted into the base tubular portion 221 to be fixed to the base 22. The bearing holder 26 is disposed radially inward of the stator core 211. The stator core 211 is fixed to the bearing holder 26. That is, the stator 21 is supported by the base 22.

The bearing 27 is disposed radially outward of the shaft 11 and radially inward of the bearing holder 26 to rotatably support the shaft 11. In the present example embodiment, two bearings 27 are provided, and the two bearings 27 are disposed at an interval in the axial direction. The two bearings 27 are each a ball bearing. However, the bearings 27 may be changed in number and type appropriately. The bearing may be a sleeve bearing, for example.

In the motor 1, supplying a drive current to the coil 213 generates rotational torque between the magnet 14 and the stator 21. This causes the rotor holder 13 to rotate around the stator 21. When the rotor holder 13 rotates, the impeller 2 fixed to the rotor holder 13 also rotates about the center axis C. The motor 1 of the present example embodiment is an outer rotor type motor in which the magnet 14 constituting the rotating part 10 is disposed radially outward of the stator 21. However, the motor to which the present disclosure is applied may be an inner rotor type motor in which a magnet constituting a rotating part is disposed radially inward of a stator.

FIG. 6 is a view of FIG. 5 excluding the circuit board 23. FIG. 7 is a schematic longitudinal sectional view illustrating an enlarged periphery of the conductive member 24. As illustrated in FIGS. 6 and 7, the base 22 is provided in its axially upper surface with an opening 223 that overlaps the conductive member 24 when viewed axially. Specifically, the conductive member 24 overlaps a region provided with the opening 223 of the base 22 when viewed axially. More specifically, the extending portion 24a of the conductive member 24 overlaps the region provided with the opening 223 of the base 22 when viewed axially. In the present example embodiment, the opening 223 has a circular shape in plan view in the axial direction. However, the opening 223 may have another shape such as a polygonal shape or an elliptical shape.

Providing the opening 223 enables a space to be easily secured axially below the conductive member 24 when the motor 1 is reduced in axial thickness. This causes the resin constituting the resin portion 25 to be easily poured into the space axially below the conductive member 24, so that sealing with the resin can be appropriately performed. Providing the opening 223 also enables the conductive member 24 and the base 22 to be less likely to come into contact with each other when the motor 1 is reduced in axial thickness, even with variations in the amount of downward projection of the conductive member 24 from the stator 21 in the axial direction. That is, even when the variations occur during manufacturing, the motor 1 can be manufactured by reducing influence of the variations.

The opening 223 is provided at a position overlapping each conductive member 24 when viewed axially. In the present example embodiment, a plurality of the conductive members 24 is provided. Thus, a plurality of the openings 223 is also provided in the base 22.

As illustrated in FIG. 7, the opening 223 in the present example embodiment is a through-hole passing through the base 22 in the axial direction. However, the opening 223 does not need to be a through-hole. For example, the opening may be a recess, for example, as illustrated in FIG. 9. However, forming the opening 223 as a through-hole as in the present example embodiment enables a dimensional error in the axial direction of the conductive member 24 or an assembly error to be addressed more easily as compared with forming the opening as a recess. Forming the opening 223 as a through-hole as in the present example embodiment also enables preventing the base 22 from having a thin portion and reducing possibility that the base 22 is affected by an impact.

The opening 223 has an area in plan view in the axial direction that is larger than an area of the extending portion 24a. In the present example embodiment, the opening 223 has a diameter larger than a diameter of the extending portion 24a. As a result, even when a plurality of the conductive members 24 is provided and mounting positions of the conductive members 24 to the stator 21 vary, for example, the extending portion 24a can be easily allowed to overlap the opening 223 when viewed axially in each of the conductive members 24.

The conductive member 24 has an axially lower end disposed axially below an axially upper end of an inner peripheral surface of the opening 223. In other words, the axially lower end of the conductive member 24 is disposed axially below the axially upper surface of the base 22, provided with the opening 223. The inner peripheral surface of the opening 223 and the conductive member 24 face each other in the circumferential direction with the resin portion 25 interposed therebetween. The conductive member 24 is inserted into the opening 223. This enables reducing an axial distance between the stator 21 and the base 22, so that the motor 1 can be reduced in axial thickness.

In the present example embodiment, the resin constituting the resin portion 25 located in the opening 223 is disposed axially below the conductive member 24. Specifically, the conductive member 24 is inserted into the opening 223 such that the axially lower end of the conductive member 24 is disposed axially above the axially lower end of the inner peripheral surface of the opening 223. Then, the resin constituting the resin portion 25 is disposed axially below the conductive member 24 in the opening 223. This structure enables reducing possibility that the conductive member 24 is exposed to the outside. Preventing the conductive member 24 from being exposed to the outside enables preventing foreign matters such as water or dust from adhering to the conductive member 24.

The inside of the opening 223 is preferably filled with the resin constituting the resin portion 25. This enables further reducing the possibility that the conductive member 24 is exposed to the outside by covering the conductive member 24 with the resin.

The conductive member 24 may be inserted into the opening 223 such that the axially lower end of the conductive member 24 projects downward in the axial direction from the axially lower end of the inner peripheral surface of the opening 223. The axially lower end of the conductive member 24 may be disposed axially above the axially upper end of the inner peripheral surface of the opening 223. That is, the conductive member 24 may be configured not to be inserted into the opening 223.

The opening 223 preferably has a cross-sectional area perpendicular to the axial direction, changing continuously or stepwise in at least a part of a range from the axially upper end of the inner peripheral surface of the opening 223 to the axially lower end thereof. This enables not only improvement in facilitating assembly of the motor 1 but also improvement in strength of the motor 1. When the opening 223 has a circular shape in plan view in the axial direction as in the present example embodiment, the opening 223 may be configured to change in diameter continuously or stepwise in at least a part of the range from the axially upper end of the inner peripheral surface of the opening 223 to the axially lower end thereof.

The opening 223 may have a constant cross-sectional area perpendicular to the axial direction in the range from the axially upper end of the inner peripheral surface of the opening 223 to the axially lower end thereof. The opening 223 may have a constant diameter in the range from its axially upper end to axially lower end.

In the present example embodiment, the inner peripheral surface of the opening 223 includes an inclined portion 223a decreasing in cross-sectional area perpendicular to the axial direction of the opening 223 from the axially upper end in an axially downward direction. This structure enables the resin to be easily poured into the opening 223 by increasing a cross-sectional area of the opening 223 on a side where the resin flows to form the resin portion 25 while preventing the base 22 from deteriorating in strength due to reduction in amount of the members constituting the base 22, caused by providing the opening 223. This structure also enables reducing possibility that the solder 231 or the like connecting the conductive member 24 to the circuit board 23 comes into contact with the base 22, by increasing a cross-sectional area of a portion of the opening 223, close to the circuit board 23, while preventing the base 22 from deteriorating in strength caused by providing the opening 223.

Specifically, the inner peripheral surface of the opening 223 includes the inclined portion 223a having a diameter decreasing from the axially upper end toward the axially lower side. The inclined portion 223a is provided from the axially upper end of the inner peripheral surface of the opening 223 to the first intermediate position P1 midway in an axially downward direction. However, the inclined portion 223a may be provided from the axially upper end of the inner peripheral surface of the opening 223 to the axially lower end thereof. The inclined portion 223a may not be provided. Instead of the structure in which the cross-sectional area perpendicular to the axial direction of the opening 223 continuously decreases downward in the axial direction due to the inclined portion 223a, the cross-sectional area perpendicular to the axial direction of the opening 223 may decreases downward in a stepwise manner in the axial direction. As an example of the structure described above, the inner peripheral surface of the opening 223 may have a diameter decreasing downward in a stepwise manner in the axial direction.

In the present example embodiment, the cross-sectional area perpendicular to the axial direction of the opening 223 increases toward the axially downward direction within a range from the first intermediate position P1 in the axial direction of the inner peripheral surface of the opening 223 to a second intermediate position P2 midway in the axially downward direction. The cross-sectional area of the opening 223 perpendicular to the axial direction is wider at the second intermediate position P2 than at a position of the axially upper end. The cross-sectional area of the opening 223 perpendicular to the axial direction is uniform within a range from the second intermediate position P2 of the inner peripheral surface of the opening 223 to a position of the axially lower end thereof. Specifically, the opening 223 has a diameter increasing toward the axially downward direction within the range from the first intermediate position P1 in the axial direction of the inner peripheral surface of the opening 223 to the second intermediate position P2 midway in the axially downward direction. The opening 223 has a wider diameter at the second intermediate position P2 than at the position of the axially upper end. The opening 223 has a uniform diameter within the range from the second intermediate position P2 of the inner peripheral surface of the opening 223 to the position of the axially lower end thereof.

The cross-sectional area perpendicular to the axial direction of the opening 223 may increase toward the axially downward direction within a range from the first intermediate position P1 in the axial direction of the inner peripheral surface of the opening 223 to the position of the axially lower end thereof. Specifically, the opening 223 may have a diameter increasing toward the axially downward direction within the range from the first intermediate position P1 in the axial direction of the inner peripheral surface of the opening 223 to the position of the axially lower end thereof. Additionally, no taper shape may be provided within an axial range from the first intermediate position P1 to the second intermediate position P2, and the cross-sectional area perpendicular to the axial direction of the opening 223 may be uniform within the range from the first intermediate position P1 to the position of the axially lower end. Specifically, the opening 223 may have a uniform diameter within the range from the first intermediate position P1 to the position of the axially lower end.

The opening 223 is provided as described above, so that in the present example embodiment, the resin constituting the resin portion 25 located in the opening 223 includes an enlarged cross-sectional area portion 25a that is located axially below the axially upper end of the inner peripheral surface of the opening 223, and that has a larger cross-sectional area than the cross-sectional area perpendicular to the axial direction at the axially upper end thereof. This structure allows the enlarged cross-sectional area portion 25a to be hooked on the base 22, and thus enabling the resin portion 25 to be less likely to come off from the base 22 in the axial direction.

In the present example embodiment, the base 22 is provided in its axially lower surface with a base lower surface recessed portion 225 that is recessed axially upward and that temporarily disposes a mold used for forming the resin portion 25. FIG. 8 is a plan view schematically illustrating a relationship between the base lower surface recessed portion 225 and the opening 223. FIG. 8 is a plan view when viewed from below in the axial direction. The base lower surface recessed portion 225 is disposed in each region provided with the opening 223.

The base lower surface recessed portion 225 includes a first region R1 that axially overlaps the region provided with the opening 223 and a second region R2 that surrounds the first region R1, in plan view in the axial direction. The first region R1 is spatially connected to the opening 223. This allows the mold used for forming the resin portion 25 to come into contact with the second region R2. Providing the base lower surface recessed portion 225 enables reducing an area in which the mold and the base 22 are in contact with each other, and thus enabling the mold to be easily disposed parallel to the base 22. Providing the base lower surface recessed portion 225 also enables preventing resin from protruding downward from an axially lower surface of the base 22 even when the resin leaks from the opening 223 at the time of forming the resin portion 25. That is, this structure enables facilitating management of the motor 1 during manufacturing.

FIG. 9 is a view for illustrating a first modification of the motor 1 according to an example embodiment of the present disclosure. As illustrated in FIG. 9, an opening 223A provided in an axially upper surface of a base 22A is a recessed portion recessed downward in the axial direction. Even this case enables a space to be easily secured below a conductive member 24 in the axial direction. Even when the amount of downward projection in the axial direction of the conductive member 24 from the stator 21 varies, the conductive member 24 and the base 22 can be less likely to come into contact with each other. The conductive member 24 also can be covered with resin poured into the opening 223A. When the opening 223A is a recessed portion, foreign matters such as water and dust can be prevented from entering the inside through the opening. Forming the opening 223A as a recessed portion enables preventing the resin from leaking to the outside when a resin portion 25 is formed. Forming the opening 223A as a recessed portion also enables eliminating the need for a mechanism such as a mold for closing the opening when the resin portion 25 is formed. In the present modification, the base 22A can be provided with a thin portion 224 having a small axial thickness.

FIG. 10 is a view for illustrating a second modification of the motor 1 according to an example embodiment of the present disclosure. As illustrated in FIG. 10, a base 22B includes an opening 223B formed as a through-hole passing through the base 22B in the axial direction. The opening 223B has an area smaller at a position of an axially lower end of an inner peripheral surface of the opening 223B than at a position of an axially upper end thereof. Specifically, the opening 223B has a diameter smaller at the position of the axially lower end of the inner peripheral surface of the opening 223B than at the position of the axially upper end thereof. Such a structure enables resin to be easily poured into opening 223B from above in the axial direction when a resin portion 25 is formed. The opening 223B can be reduced in area in an axially lower surface of the base 22B, and thus enabling reduction in possibility that foreign matters such as moisture or dust enters the inside of the motor 1 from an axially lower surface side of the base 22B through the opening 223B.

Although the modification illustrated in FIG. 10 is configured to have a cross-sectional area perpendicular to the axial direction of the opening 223B, changing stepwise in an axially downward direction, the cross-sectional area perpendicular to the axial direction of the opening 223B may change continuously in the axially downward direction.

Various technical features disclosed in the present specification can be variously modified without departing from the gist of the technical creation. Additionally, the plurality of example embodiments and modifications shown in the present specification may be combined and implemented as far as possible.

The present disclosure can be used for, for example, a cooling fan for vehicles, home appliances, office equipment, and the like.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotating portion that is rotatable about a center axis that extends vertically; and
a stationary portion that rotatably supports the rotating portion;
the stationary portion including:
a stator including a coil, radially facing at least a portion of the rotating portion;
a base disposed axially below the stator;
a circuit board disposed axially between the stator and the base;
a conductor electrically connected to the coil and the circuit board, including an extending portion extending axially downward from the circuit board; and
a resin portion covering the circuit board and the conductor, connecting the base and the stator;
the base being provided in its axially upper surface with an opening that overlaps the conductor when viewed axially;
a cross-sectional area perpendicular or substantially perpendicular to an axial direction of the opening changes continuously or stepwise within at least a portion of a range from an axially upper end of an inner peripheral surface of the opening to an axially lower end of the inner peripheral surface of the opening.

2. The motor according to claim 1, wherein the opening has a larger area than the extending portion in plan view from an axial direction.

3. The motor according to claim 1, wherein the conductor includes an axially lower end disposed axially below an axially upper end of an inner peripheral surface of the opening.

4. The motor according to claim 1, wherein resin of the resin portion located in the opening is disposed axially below the conductor.

5. The motor according to claim 1, wherein the opening is a through-hole that passes through the base in the axial direction.

6. The motor according to claim 1, wherein the resin of the resin portion located in the opening includes an enlarged cross-sectional area portion that is located axially below the axially upper end of the inner peripheral surface of the opening, and that has a larger cross-sectional area than the cross-sectional area perpendicular or substantially perpendicular to the axial direction at the axially upper end.

7. The motor according to claim 1, wherein the opening has an area smaller at a position of the axially lower end of the inner peripheral surface of the opening than at a position of the axially upper end of the inner peripheral surface of the opening.

8. The motor according to claim 1, wherein the inner peripheral surface of the opening includes an inclined portion decreasing in cross-sectional area perpendicular or substantially perpendicular to the axial direction of the opening from the axially upper end in an axially downward direction.

9. A blower comprising:
the motor according to claim 1; and
an impeller that is rotatable together with the rotating portion.

* * * * *